United States Patent
Wang et al.

(10) Patent No.: US 9,525,883 B2
(45) Date of Patent: Dec. 20, 2016

(54) CROSS-LAYER ALIGNMENT OF INTRA RANDOM ACCESS POINT PICTURES

(71) Applicant: QUALCOMM Incorporated, San Diego, CA (US)

(72) Inventors: Ye-Kui Wang, San Diego, CA (US); Fnu Hendry, Poway, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 14/331,020

(22) Filed: Jul. 14, 2014

(65) Prior Publication Data

US 2015/0016546 A1    Jan. 15, 2015

Related U.S. Application Data

(60) Provisional application No. 61/846,583, filed on Jul. 15, 2013.

(51) Int. Cl.
*H04N 19/46* (2014.01)
*H04N 19/169* (2014.01)
(Continued)

(52) U.S. Cl.
CPC .......... *H04N 19/188* (2014.11); *H04N 19/187* (2014.11); *H04N 19/30* (2014.11);
(Continued)

(58) Field of Classification Search
CPC .... H04N 19/187; H04N 19/188; H04N 19/30; H04N 19/46; H04N 19/597; H04N 19/70
(Continued)

(56) References Cited

U.S. PATENT DOCUMENTS

| 2004/0228413 A1* | 11/2004 | Hannuksela | H04N 21/6437 375/240.25 |
| 2011/0122944 A1* | 5/2011 | Gupta | H04N 19/176 375/240.12 |

(Continued)

OTHER PUBLICATIONS

Chen, et al., "MV-HEVC/SHVC HLS: On restriction and indication of cross-layer IRAP picture distribution", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0147, XP030114616, 3 pp.

(Continued)

*Primary Examiner* — Shan Elahi
(74) *Attorney, Agent, or Firm* — Shumaker & Sieffert, P.A.

(57) ABSTRACT

A video processing device includes a memory storing video data and one or more processors configured to: receive a first network abstraction layer (NAL) unit comprising a first picture of an access unit; in response to determining the first NAL unit comprises an intra random access point (IRAP) picture and in response to a NAL unit type for the first NAL unit indicating the presence of an instantaneous decoding refresh (IDR) picture without any associated leading pictures for a second NAL unit of the access unit comprising another IRAP picture, determine a NAL unit type for the second NAL unit to be a NAL unit type indicating the presence of an IDR picture without any associated leading pictures; and, process the first NAL unit and the second NAL unit based on the NAL unit type for the second NAL unit.

30 Claims, 6 Drawing Sheets

(51) Int. Cl.
*H04N 19/597* (2014.01)
*H04N 19/70* (2014.01)
*H04N 19/30* (2014.01)
*H04N 19/187* (2014.01)

(52) U.S. Cl.
CPC .......... *H04N 19/46* (2014.11); *H04N 19/597* (2014.11); *H04N 19/70* (2014.11)

(58) Field of Classification Search
USPC .................................................. 375/240.26
See application file for complete search history.

(56) References Cited

U.S. PATENT DOCUMENTS

| | | | | |
|---|---|---|---|---|
| 2011/0280314 | A1* | 11/2011 | Sankaran | G06F 9/3877 375/240.25 |
| 2011/0299601 | A1* | 12/2011 | Lai | H04N 21/8451 375/240.25 |
| 2012/0281748 | A1* | 11/2012 | Peng | H04N 19/149 375/240.01 |
| 2014/0211849 | A1* | 7/2014 | Deshpande | H04N 19/105 375/240.12 |
| 2014/0247878 | A1* | 9/2014 | Xu | H04N 19/52 375/240.16 |
| 2014/0301436 | A1* | 10/2014 | Wang | H04N 19/70 375/240.02 |
| 2014/0301437 | A1* | 10/2014 | Wang | H04N 19/70 375/240.02 |
| 2014/0301439 | A1* | 10/2014 | Chen | H04N 19/70 375/240.02 |
| 2014/0314140 | A1* | 10/2014 | Rapaka | H04N 19/70 375/240.02 |

OTHER PUBLICATIONS

Choi, et al., "AHG7: On Random access point pictures and picture order counts for MV-HEVC", JCT-3V Meeting; MPEG Meeting; Jan. 17-23, 2013, Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0081, XP030130497, 3 pp.
Choi, et al., "Parameter set and other related issues for MV-HEVC and other HEVC extension", JCT-3V Meeting; Apr. 20-26, 2013, Incheon; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0240, XP030130904, 4 pp.
Deshpande, "AHG9:Comments on SHVC and MV-HEVC", JCT-VC Meeting; MPEG Meeting; Apr. 18-26, 2013, Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0208, XP030114165, 6 pp.
Ikai et al., "AHG7: RAP picture alignment and slice definition", JCT-3V Meeting; MPEG Meeting; Jan. 17-23, 2013, Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0085, XP030130501, 4 pp.
International Search Report and Written Opinion of International Application No. PCT/US2014/046686, mailed Oct. 1, 2014, 14 pp.
Liebl G., et al., "Advanced Wireless Multiuser Video Streaming Using the Scalable Video Coding Extensions of H.264/MPEG4-AVC", ICME 2006, Jul. 6, 2006, XP055120626 4 pp.
Sjoberg, et al., "Overview of HEVC high-level syntax and reference picture management", IEEE Transactions on Circuits and Systems for Video Technology, Jan. 2012, XP055045360, ISSN: 1051-8215, DOI: 10.11 09/TCSVT.2012.2223052, 14 pp.
Tech, et al., "MV-HEVC Draft Text 4-JCT3V-D1004 v4", Joint Collaborative Team on 3D Video Coding Extension Development of ITU-T SG 16 WP 3 and ISO/IEC JTC 1/SC 29/WG 11 4th Meeting: Incheon, vol. JCT3V-D1004 v4, Apr. 20-26, 2013, XP055141490, 62 pp.
Wang, et al., "MV-HEVC/SHVC HLS: On various cross-layer alignments", JCT-VC Meeting; Jul. 25-Aug. 2, 2013, Vienna; (Joint Collaborative Team on Video Coding of ISO/IEC JTC1/SC29/WG11 and ITU-T SG.16 ); URL: http://wftp3.itu.int/av-arch/jctvc-site/, No. JCTVC-N0084, XP030114530, 5 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
ITU-T H265, Series H: Audiovisual and Multimedia Systems, Infrastructure of audiovisual services—Coding of moving video, High efficiency video coding, The International Telecommunication Union, Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2010, 674 pp.
Second Written Opinion of International Application No. PCT/US2014/046686, mailed Jun. 17, 2015, 6 pp.
International Preliminary Report on Patentability from International Application No. PCT/US2014/046686, mailed Oct. 2, 2015, 23 pp.
Response to Written Opinion mailed Oct. 1, 2014, from international application number PCT/US2014/046686, dated May 15, 2015, 23 pp.
Response to Second Written Opinion mailed Jun. 17, 2015, from International Application No. PCT/US2013/077828, dated Aug. 17, 2015, 18 pp.
Chen et al., "SHVC Working Draft 2," JCTVC-M1008_v3, 13 Meeting: Incheon, KR, Apr. 18-26, 2013, 67 pp.
Bross et al., "Editors' proposed corrections to HEVC version 1," Joint Collaborative Team on Video Coding (JCT-VC) of ITU-T SG 16 WP 3 and ISO/IEC JCT 1/SC 29/WG 11, 13 Meeting: Incheon, KR, Apr. 18-26, 2013, JCTVC_M0432_v3, 310 pp.
Wang et al., "AHG9: On cross-layer alignments in HEVC 3DV and scalable extensions," Joint Collaborative Team on Video Coding

(56) References Cited

OTHER PUBLICATIONS (JCT-VC) of ITU-T SG 16 WP 3 and ISO/IEC JCT 1/SC 29/WG 11, 13 Meeting: Incheon, KR, April 18-26, 2013, JCTVC-M0266_v2, 6 pp.

Gerhard et al., Joint Collaborative Team on 3d Video Coding Extension Development of ITU-T SG 16 WP 3 and ISO/IEC JTC 1/SC 29/WG 11, 3 Meeting: Geneva, CH, Jan. 17-23, 2013, JCT3V-C1004_d3, 39 pp.

* cited by examiner

CROSS-LAYER ALIGNMENT OF INTRA RANDOM ACCESS POINT PICTURES

This application claims the benefit of U.S. Provisional Application Ser. No. 61/846,583, filed 15 Jul. 2013, the entire content of which is incorporated by reference herein.

TECHNICAL FIELD

This disclosure relates to video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes various potential improvements on requirements for cross-layer alignment of intra random access point (IRAP) pictures in multi-layer video coding. The techniques of this disclosure may be implemented by various types of video processing devices such as video encoders, video decoders, media aware network elements (MANEs), transcoding devices, and other types of video processing devices.

According to one example, a method of processing video data includes, receiving a first network abstraction layer (NAL) unit comprising a first picture of an access unit; in response to determining the first NAL unit comprises an intra random access point (IRAP) picture and in response to a NAL unit type for the first NAL unit indicating the presence of an instantaneous decoding refresh (IDR) picture without any associated leading pictures, determining a NAL unit type for the second NAL unit to be a NAL unit type indicating the presence of an IDR picture without any associated leading pictures, wherein the second NAL unit of the access unit comprises another IRAP picture; and, processing the first NAL unit and the second NAL unit based on the NAL unit type for the second NAL unit.

According to another example, a method of processing video data includes processing a first network abstraction layer (NAL) unit comprising a first picture of an access unit; in response to determining the first NAL unit comprises an intra random access point (IRAP) picture and in response to a NAL unit type for the first NAL unit indicating the presence of an instantaneous decoding refresh (IDR) picture without any associated leading pictures, for a second NAL unit of the access unit comprising another IRAP picture, setting a NAL unit type for the second NAL unit to a NAL unit type indicating the presence of an IDR picture without any associated leading pictures; and, processing the first NAL unit and the second NAL unit based on the NAL unit type for the first NAL unit and the NAL unit type for the second NAL unit.

According to another example, a video processing device includes a memory storing video data and one or more processors configured to: receive a first network abstraction layer (NAL) unit comprising a first picture of an access unit; in response to determining the first NAL unit comprises an intra random access point (IRAP) picture and in response to a NAL unit type for the first NAL unit indicating the presence of an instantaneous decoding refresh (IDR) picture without any associated leading pictures, determine a NAL unit type for the second NAL unit to be a NAL unit type indicating the presence of an IDR picture without any associated leading pictures, wherein the second NAL unit of the access unit comprises another IRAP picture; and, process the first NAL unit and the second NAL unit based on the NAL unit type for the second NAL unit.

According to another example, a video processing device includes a memory storing video data; and one or more processors configured to: process a first network abstraction layer (NAL) unit comprising a first picture of an access unit; in response to determining the first NAL unit comprises an intra random access point (IRAP) picture and in response to a NAL unit type for the first NAL unit indicating the presence of an instantaneous decoding refresh (IDR) picture without any associated leading pictures, for a second NAL unit of the access unit comprising another IRAP picture, set a NAL unit type for the second NAL unit to a NAL unit type indicating the presence of an IDR picture without any associated leading pictures; and, process the first NAL unit and the second NAL unit based on the NAL unit type for the first NAL unit and the NAL unit type for the second NAL unit.

According to another example, a computer-readable storage medium stores instructions that when executed by one or more processors cause the one or more processors to: receive a first network abstraction layer (NAL) unit comprising a first picture of an access unit; in response to determining the first NAL unit comprises an intra random access point (IRAP) picture and in response to a NAL unit type for the first NAL unit indicating the presence of an instantaneous decoding refresh (IDR) picture without any associated leading pictures for a second NAL unit of the access unit comprising another IRAP picture, determine a NAL unit type for the second NAL unit to be a NAL unit type indicating the presence of an IDR picture without any associated leading pictures; and, process the first NAL unit and the second NAL unit based on the NAL unit type for the second NAL unit.

According to another example, an apparatus for processing video data includes means for receiving a first network abstraction layer (NAL) unit comprising a first picture of an access unit; means for determining a NAL unit type for the second NAL unit to be a NAL unit type indicating the presence of an IDR picture without any associated leading pictures in response to determining the first NAL unit comprises an intra random access point (IRAP) picture and in response to a NAL unit type for the first NAL unit indicating the presence of an instantaneous decoding refresh (IDR) picture without any associated leading pictures for a second NAL unit of the access unit comprising another IRAP picture; and, means for processing the first NAL unit and the second NAL unit based on the NAL unit type for the second NAL unit.

The details of one or more examples are set forth in the accompanying drawings and the description below. Other features, objects, and advantages will be apparent from the description and drawings, and from the claims.

DETAILED DESCRIPTION

Figure 1:
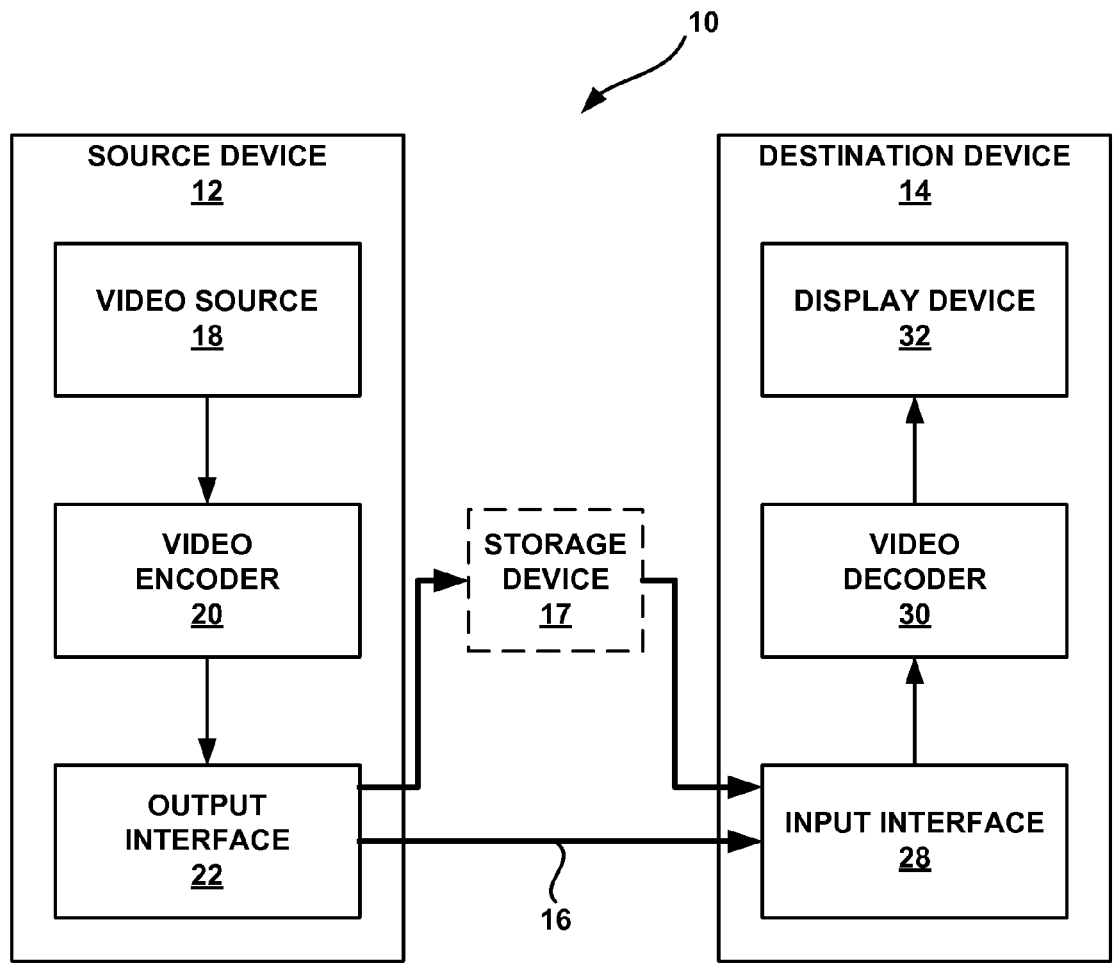
FIG. 1 is a block diagram illustrating an example video encoding and decoding system that may utilize the techniques described in this disclosure.

This disclosure describes various improvements on requirements for cross-layer alignment of intra random access point (IRAP) pictures in multi-layer video coding. Multi-layer video coding includes, for example, multiview video coding, scalable video coding, and three-dimensional (3D) video coding. As will be explained in greater detail below, the techniques of this disclosure may improve the viewing experience of a viewer when moving from one bitstream to another bitstream (e.g. switching a channel) or jumping from one point in a bitstream to another point in the bitstream.

This disclosure will make reference to processing video data. Processing video data may refer to encoding and decoding video data, but processing may also refer to other operations performed on video data that do not necessarily include a full encoding or decoding process. In some examples, processing may comprise parsing video data to form a sub-bitstream from a bitstream or may include parsing video data for purposes of routing video data to a destination device. The processing may be performed by a video encoder, a video decoder, a transcoding device, a media aware network element (MANE) or another device that is used for video processing Existing methods for cross-layer IRAP picture alignment have several potential shortcomings. As one example, existing methods typically do not work well in instances where it is possible to have one access unit containing both random access skipped leading (RASL) pictures and random access decodable leading (RADL) pictures. However, there are situations where mixing of some broken link access (BLA) pictures, some having with associated RASL pictures and some not having associated RASL picture but having associated RADL pictures may be desirable.

As another example, it may be undesirable to allow for an access unit containing both leading pictures and non-leading pictures. Thus, mixing of the two different types of instantaneous decoding refresh (IDR) pictures should not be allowed. As another example, in some cases, it may be beneficial to enable mixing of clean random access (CRA) pictures and BLA pictures.

In one or more examples, this disclosure uses many of the terms and terminology defined in HEVC WD10. According to HEVC WD10, a network abstraction layer (NAL) unit is defined as follows:
network abstraction layer (NAL) unit: A syntax structure containing an indication of the type of data to follow and bytes containing that data in the form of an RESP [raw byte sequence payload] interspersed as necessary with emulation prevention bytes.

According to HEVC WD10, an access unit is defined as follows:
access unit: A set of NAL units that are associated with each other according to a specified classification rule, are consecutive in decoding order, and contain exactly one coded picture.
NOTE 1—In addition to containing the VCL NAL units of the coded picture, an access unit may also contain non-VCL NAL units. The decoding of an access unit always results in a decoded picture.

In multi-layer video coding, the definition of an access unit may be extended to include all video pictures, and possibly depth maps for 3D video coding, that correspond to the same time instance.

According to HEVC WD10, an IRAP picture is defined as follows:
intra random access point (IRAP) picture: A coded picture for which each VCL NAL unit has nal_unit_type in the range of 16 to 23, inclusive.
NOTE 7—An IRAP picture contains only I slices, and may be a BLA picture, a CRA picture or an IDR picture. The first picture in the bitstream in decoding order must be an IRAP picture. Provided the necessary parameter sets are available when they need to be activated, the IRAP picture and all subsequent non-RASL pictures in decoding order can be correctly decoded without performing the decoding process of any pictures that precede the IRAP picture in decoding order. There may be pictures in a bitstream that contain only I slices that are not IRAP pictures.

According to HEVC WD 10, a RASL picture is defined as follows:

random access skipped leading (RASL) picture: A coded picture for which each VCL NAL unit has nal_unit_type equal to RASL_R or RASL_N.

> NOTE 15—All RASL pictures are leading pictures of an associated BLA or CRA picture. When the associated IRAP picture has NoRaslOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated IRAP picture.

According to HEVC WD 10, a RADL picture is defined as follows:

random access decodable leading (RADL) picture: A coded picture for which each VCL NAL unit has nal_unit_type equal to RADL_R or RADL_N.

> NOTE 14—All RADL pictures are leading pictures. RADL pictures are not used as reference pictures for the decoding process of trailing pictures of the same associated IRAP picture. When present, all RADL pictures precede, in decoding order, all trailing pictures of the same associated IRAP picture.

According to HEVC WD10, an IDR picture is defined as follows:

instantaneous decoding refresh (IDR) picture: An IRAP picture for which each VCL NAL unit has nal_unit_type equal to IDR_W_RADL or IDR_N_LP.

> NOTE 6—An IDR picture contains only I slices, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

According to HEVC WD10, a CRA picture is defined as follows:

clean random access (CRA) picture: An IRAP picture for which each VCL NAL unit has nal_unit_type equal to CRA_NUT.

> NOTE 4—A CRA picture contains only I slices, and may be the first picture in the bitstream in decoding order, or may appear later in the bitstream. A CRA picture may have associated RADL or RASL pictures. When a CRA picture has NoRaslOutputFlag equal to 1, the associated RASL pictures are not output by the decoder, because they may not be decodable, as they may contain references to pictures that are not present in the bitstream.

According to HEVC WD10, a BLA picture is defined as follows:

broken link access (BLA) picture: An IRAP picture for which each VCL NAL unit has nal_unit_type equal to BLA_W_LP, BLA_W_RADL, or BLA_N_LP.

> NOTE 2—A BLA picture contains only I slices, and may be the first picture in the bitstream in decoding order, or may appear later in the bitstream. Each BLA picture begins a new CVS, and has the same effect on the decoding process as an IDR picture. However, a BLA picture contains syntax elements that specify a non-empty reference picture set. When a BLA picture for which each VCL NAL unit has nal_unit_type equal to BLA_W_LP, it may have associated RASL pictures, which are not output by the decoder and may not be decodable, as they may contain references to pictures that are not present in the bitstream. When a BLA picture for which each VCL NAL unit has nal_unit_type equal to BLA_W_LP, it may also have associated RADL pictures, which are specified to be decoded. When a BLA picture for which each VCL NAL unit has nal_unit_type equal to BLA_W_RADL, it does not have associated RASL pictures but may have associated RADL pictures, which are specified to be decoded. When a BLA picture for which each VCL NAL unit has nal_unit_type equal to BLA_N_LP, it does not have any associated leading pictures.

According to HEVC WD10, the value of the syntax element nal_unit_type specifies the type of raw byte sequence payload (RBSP) data structure contained in the NAL unit as specified in Table 7-1, reproduced below.

TABLE 7-1

NAL unit type codes and NAL unit type classes

| nal_unit_type | Name of nal_unit_type | Content of NAL unit and RBSP syntax structure | NAL unit type class |
| --- | --- | --- | --- |
| 0, 1 | TRAIL_N, TRAIL_R | Coded slice segment of a non-TSA, non-STSA trailing picture slice_segment_layer_rbsp( ) | VCL |
| 2, 3 | TSA_N, TSA_R | Coded slice segment of a TSA picture slice_segment_layer_rbsp( ) | VCL |
| 4, 5 | STSA_N, STSA_R | Coded slice segment of an STSA picture slice_layer_rbsp( ) | VCL |
| 6, 7 | RADL_N, RADL_R | Coded slice segment of a RADL picture slice_layer_rbsp( ) | VCL |
| 8, 9 | RASL_N, RASL_R, | Coded slice segment of a RASL picture slice_layer_rbsp( ) | VCL |
| 10, 12 | RSV_VCL_N10 RSV_VCL_N12 | Reserved non-IRAP sub-layer non-reference VCL NAL unit types | VCL |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 14 | RSV_VCL_N14 | | |
| 11, 13, 15 | RSV_VCL_R11 RSV_VCL_R13 RSV_VCL_R15 | Reserved non-IRAP sub-layer reference VCL NAL unit types | VCL |
| 16, 17, 18 | BLA_W_LP BLA_W_RADL BLA_N_LP | Coded slice segment of a BLA picture slice_segment_layer_rbsp( ) | VCL |
| 19, 20 | IDR_W_RADL IDR_N_LP | Coded slice segment of an IDR picture slice_segment_layer_rbsp( ) | VCL |
| 21 | CRA_NUT | Coded slice segment of a CRA picture slice_segment_layer_rbsp( ) | VCL |
| 22, 23 | RSV_IRAP_VCL22 . . . RSV_IRAP_VCL23 | Reserved IRAP VCL NAL unit types | VCL |
| 24 . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39, 40 | PREFI_SEI_NUT SUFFIX_SEI_NUT | Supplemental enhancement information (SEI) sei_rbsp( ) | non-VCL |
| 41 . . . 47 | RSV_NVCL41 . . . RSV_NVCL47 | Reserved | non-VCL |
| 48 . . . 63 | UNSPEC48 . . . UNSPEC63 | Unspecified | non-VCL |

NOTE 3—A CRA picture may have associated RASL or RADL pictures present in the bitstream.

NOTE 4—A BLA picture having nal_unit_type equal to BLA_W_LP may have associated RASL or RADL pictures present in the bitstream. A BLA picture having nal_unit_type equal to BLA_W_RADL does not have associated RASL pictures present in the bitstream, but may have associated RADL pictures in the bitstream. A BLA picture having nal_unit_type equal to BLA_N_LP does not have associated leading pictures present in the bitstream.

NOTE 5—An IDR picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

Referring to Table 7-1 above, a NAL unit with NAL unit type IDR_W_RADL includes one or more slice segments for an IDR picture with associated RADL pictures. A NAL unit with NAL unit type IDR_N_LP includes one or more slice segments for an IDR picture without any associated leading pictures. A NAL unit with NAL unit type BLA_N_LP includes one or more slice segments for a BLA picture without associated leading pictures. A NAL unit with NAL unit type BLA_W_LP includes one or more slice segments for a BLA picture with associated leading pictures. A NAL unit with NAL unit type IDR_W_RADL includes one or more slice segments for an IDR picture without associated RADL pictures. A NAL unit with NAL unit type CRA_NUT includes one or more slice segments for a CRA picture for which each VCL NAL unit of the CRA picture comprises a coded slice segment of the CRA picture.

This disclosure potentially addresses one or more of the shortcomings discussed above. In particular, in one or more examples, the techniques of this disclosure may impose one or more of the following restrictions on cross-layer IRAP picture alignment:

1) When one IRAP picture in an access unit has nal_unit_type equal to IDR_N_LP, any other IRAP picture in the same access unit shall have nal_unit_type equal to IDR_N_LP.
2) When one IRAP picture in an access unit has nal_unit_type equal to IDR_W_RADL any other IRAP picture in the same access unit shall have nal_unit_type equal to IDR_W_RADL.
3) When one IRAP picture in an access unit has nal_unit_type equal to BLA_N_LP, any other IRAP picture in the same access unit shall have nal_unit_type equal to BLA_N_LP or CRA_NUT.
4) When one IRAP picture in an access unit has nal_unit_type equal to BLA_W_LP or BLA_W_RADL, any other IRAP picture in the same access unit shall have nal_unit_type equal to BLA_W_LP, BLA_W_RADL, or CRA_NUT.

Note: When one IRAP picture in an access unit has nal_unit_type equal to CRA_NUT, any other IRAP picture in the same access unit must have nal_unit_type equal to CRA_NUT, BLA_W_LP, BLA_W_RADL, or BLA_N_LP.

Alternatively, in other examples, the above items 3 and 4 in the previous paragraph may be changed as follows, such that it is disallowed to have BLA_N_LP in a lower layer and CRA_NUT in higher layer:

3) When one IRAP picture in an access unit has nal_unit_type equal to BLA_N_LP and has nuh_layer_id equal to layerId, any other IRAP picture in the same access unit that has nuh_layer_id less than layerId shall have nal_unit_type equal to BLA_N_LP or CRA_NUT.

4) When one IRAP picture in an access unit has nal_unit_type equal to BLA_W_LP or BLA_W_RADL and has nuh_layer_id equal to layerId, any other IRAP picture in the same access unit that has nuh_layer_id less than layerId shall have nal_unit_type equal to BLA_W_LP, BLA_W_RADL, or CRA_NUT.

Alternatively, in still other examples the above items 3 and 4 in the previous paragraphs may be changed as follows, such that it is disallowed to have BLA_N_LP in a lower layer and CRA_NUT in higher layer:

3) When one IRAP picture in an access unit has nal_unit_type equal to BLA_N_LP and has nuh_layer_id equal to layerIdA, any other IRAP picture in the same access unit that has nuh_layer_id equal to layerIdB, where layerIdB is less than layerIdA and direct_dependency_flag[LayerIdxInVps[layerIdA]][LayerIdxInVps[layerIdB]] is equal to 1, shall have nal_unit_type equal to BLA_N_LP or CRA_NUT.

4) When one IRAP picture in an access unit has nal_unit_type equal to BLA_W_LP or BLA_W_RADL and has nuh_layer_id equal to layerIdA, any other IRAP picture in the same access unit that has nuh_layer_id equal to layerIdB, where layerIdB is less than layerIdA and direct_dependency_flag[LayerIdxInVps[layerIdA]][LayerIdxInVps[layerIdB]] is equal to 1, shall have nal_unit_type equal to BLA_W_LP, BLA_W_RADL, or CRA_NUT.

According to MV-HEVC Draft Text 3, a direct_dependency_flag is defined as follows:
direct_dependency_flag[i][j] equal to 0 specifies that the layer with index j is not a direct reference layer for the layer with index i. direct_dependency_flag[i][j] equal to 1 specifies that the layer with index j may be a direct reference layer for the layer with index i. When direct_dependency_flag[i][j] is not present for i and j in the range of 0 to vps_max_layers_minus1, it is inferred to be equal to 0.

Alternatively, the following restrictions on cross-layer IRAP picture alignment may be implemented:

1) When one IRAP picture in an access unit has nal_unit_type equal to BLA_W_LP, BLA_W_RADL, or BLA_N_LP, any other IRAP picture in the same access unit shall have nal_unit_type equal to BLA_W_LP, BLA_W_RADL, or BLA_N_LP.

2) When one IRAP picture in an access unit has nal_unit_type equal to IDR_W_RADL or IDR_N_LP, any other IRAP picture in the same access unit shall have nal_unit_type equal to IDR_W_RADL or IDR_N_LP.

3) When one IRAP picture in an access unit has nal_unit_type equal to CRA_NUT, any other IRAP picture in the same access unit shall have nal_unit_type equal to CRA_NUT.

According to HEVC WD 10, a CRA picture may have associated RASL or RADL pictures present in the bitstream. A BLA picture having nal_unit_type equal to BLA_W_LP may have associated RASL or RADL pictures present in the bitstream. A BLA picture having nal_unit_type equal to BLA_W_RADL does not have associated RASL pictures present in the bitstream, but may have associated RADL pictures in the bitstream. A BLA picture having nal_unit_type equal to BLA_N_LP does not have associated leading pictures present in the bitstream. An IDR picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

According to HEVC WD 10, a layer, a layer identifier list, and a layer set are defined as follows:
layer: A set of VCL NAL units that all have a particular value of nuh_layer_id and the associated non-VCL NAL units, or one of a set of syntactical structures having a hierarchical relationship.

NOTE 8—Depending on the context, either the first layer concept or the second layer concept applies. The first layer concept is also referred to as a scalable layer, wherein a layer may be a spatial scalable layer, a quality scalable layer, a view, etc. A temporal true subset of a scalable layer, or a sub-layer, is not referred to as a layer. The second layer concept is also referred to as a coding layer, wherein higher layers contain lower layers, and the coding layers are the CVS, picture, slice, slice segment, and coding tree unit layers.

layer identifier list: A list of nuh_layer_id values that is associated with a layer set or an operation point and can be used as an input to the sub-bitstream extraction process.

layer set: A set of layers represented within a bitstream created from another bitstream by operation of the sub-bitstream extraction process with the another bitstream, the target highest TemporalId equal to 6, and the target layer identifier list equal to the layer identifier list associated with the layer set as inputs.

It is anticipated that in future scalable or 3D video coding extensions of the HEVC standard, the syntax element nuh_layer_id may be used to identify additional layers that may be present in the coded video sequence (CVS). A layer may, for example, be a spatial scalable layer, a quality scalable layer, a texture view, a depth view, or some other type of layer.

As will be explained in greater detail below, the restrictions on cross-layer IRAP picture alignment introduced above may be implemented by a video encoder when encoding video data. These restrictions, if known to a video decoder or other video processing device, such as a MANE, may be used by the video decoder or MANE to infer certain information about subsequent NAL units and make processing decisions based on the inferred information. For example, based on the inferred information, a video decoder or MANE may be able to make processing decisions about certain NAL units before the NAL units arriving, which may improve decoding and routing performance. Additionally, being able to infer certain information may potentially reduce or eliminate the bits needed to signal such information.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 17. Similarly, encoded data may be accessed from storage device 17 by input interface. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 17 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 17, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Video coding standards that may be used by video encoder 20 and video decoder 30 include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Jul. 11, 2014, is downloadable from http://phenix.int-evey.fr/jct/doc_end_user/documents/12_Geneva/wg11/JCTVC-L1003-v34.zip.

Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of Jul. 11, 2014, is available from http://phenix.int-evry.fr/jct/doc_end_user/documents/13_Incheon/wg11/JCTVC-M0432-v3.zip. The entire contents of both are incorporated by reference.

The multiview extension to HEVC, namely MV-HEVC, the entire contents of which is incorporated by reference, is also being developed by the JCT-3V. A recent Working Draft (WD) of MV-HEVC WD4 hereinafter, is available from http://phenix.it-sudparis.eu/jct2/doc_end_user/documents/4 Incheon/wg 11/JCT3V-D1004-v4.zip. The scalable extension to HEVC, named SHVC, the entire contents of which is incorporated by reference, is also being developed by the JCT-VC. A recent Working Draft (WD) of SHVC and referred to as SHVC WD2 hereinafter, is available from http://phenix.it-sudparis.eu/jct/doc_end_user/documents/13_Incheon/wg11/JCTVC-M1008-v3.zip. JCT3V-M0266 (http://phenix.int-evey.fr/jct/doc_end_user/documents/13_Incheon/wg11/JCTVC-M0266-v2.zip), the entire contents of which is incorporated by reference, includes discussions and some proposed constraints on cross-layer alignment of IRAP pictures.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

According to one technique of this disclosure, a device (e.g. video encoder 20, video decoder 30, or a network device) may process video data, such that in response to a NAL unit comprising an IRAP picture in an access unit having a NAL unit type indicating the presence of an IDR picture without any associated leading pictures (e.g. IDR_N_LP), the device processes additional NAL units comprising other IRAP pictures in the same access unit to have a NAL unit type indicating the presence of an IDR picture without any associated leading pictures (e.g. IDR_N_LP).

According to another technique of this disclosure, a device (e.g. video encoder 20, video decoder 30, or a network device) may process video data such that in response to a NAL unit comprising an IRAP picture in an access unit having a NAL unit type indicating the presence of an IDR picture with associated RADL pictures (e.g. IDR_W_RADL), the devices processes additional NAL units comprising other IRAP pictures in the same access unit to have NAL unit types indicating the presence of IDR pictures with associated RADL pictures (e.g. IDR_W_RADL).

According to another technique of this disclosure, a device (e.g. video encoder 20, video decoder 30, or a network device) may process video data such that in response to a NAL unit comprising an IRAP picture in an access unit having a NAL unit type indicating the presence of a BLA picture without associated leading pictures (e.g. BLA_N_LP), the device may process additional NAL units comprising IRAP pictures in the same access unit to have NAL unit types to indicate the presence of one of a BLA picture without associated leading pictures (e.g. BLA_N_LP) and a CRA picture for which each VCL NAL unit of the CRA picture comprises a coded slice segment of the CRA picture (e.g. CRA_NUT). The device may also be configured to implement a restriction that the additional NAL units in the same access unit have layer ID values less than the layer ID value of the NAL unit. The device may also be configured to implement a restriction that that the NAL unit has a layer identification (ID) value and the additional NAL units in the same access unit have layer ID values less than the layer ID value of the NAL unit, and a direct dependency flag is set equal to a value that indicates a layer of the NAL unit is able to act as a direct reference layer for layers of the additional NAL units.

According to another technique of this disclosure, a device (e.g. video encoder 20, video decoder 30, or a network device) may process video data such that in response to a NAL unit comprising an IRAP picture in an access unit having a NAL unit type indicating the presence of one of a BLA picture with decodable leading pictures (e.g. BLA_W_LP) and a BLA picture with associated RADL pictures (e.g. BLA_W_RADL), the device processes additional NAL units comprising IRAP pictures in the access unit to have NAL unit types indicating the presence of one of a BLA picture with decodable leading pictures (e.g. BLA_W_LP), a BLA picture with associated RADL pictures, CRA picture for which each video coding layer (VCL) NAL unit of the CRA picture comprises a coded slice segment of the CRA picture (e.g. CRA_NUT). The device may also be configured to implement a restriction that the NAL unit has a layer identification (ID) value, and wherein the additional NAL units in the same access unit have layer ID values less than the layer ID value of the NAL unit. The device may also be configured to implement a restriction that the NAL unit has a layer identification (ID) value, and wherein the additional NAL units in the same access unit have layer ID values less than the layer ID value of the NAL unit, and a direct dependency flag is set equal to a value that indicates a layer of the NAL unit is able to act as a direct reference layer for layers of the additional NAL units.

According to another technique of this disclosure, a device (e.g. video encoder 20, video decoder 30, or a network device) may process video data such that in response to a NAL unit comprising an IRAP picture in an access unit having NAL unit type equal to one of a BLA picture with decodable leading pictures (e.g. BLA_W_LP), a BLA picture with associated RADL pictures (e.g. BLA_W_RADL), and a BLA picture without associated leading pictures (e.g. BLA_N_LP), the device processes additional NAL units comprising IRAP pictures in the access unit to have NAL unit types indicating the presence of a NAL unit type equal to one of a BLA picture with decodable leading pictures (e.g. BLA_W_LP), a BLA picture with associated RADL pictures (e.g. BLA_W_RADL), and a BLA picture without associated leading pictures (e.g. BLA_N_LP).

According to another technique of this disclosure, a device (e.g. video encoder 20, video decoder 30, or a network device) may process video data such that in response to a NAL unit comprising an IRAP picture in an access unit having NAL unit type to indicate the presence of one of an IDR picture with associated RADL pictures (e.g. IDR_W_RADL) and an IDR picture without associated decodable leading pictures (e.g. IDR_N_LP), the device processes additional NAL units comprising IRAP pictures in the access unit to have NAL unit types indicating the presence of to indicate the presence of one of an IDR picture with associated RADL pictures (e.g. IDR_W_RADL) and an IDR picture without associated decodable leading pictures (e.g. IDR_N_LP).

According to another technique of this disclosure, a device (e.g. video encoder 20, video decoder 30, or a network device) may process video data such that in response to a NAL unit comprising an IRAP picture in an access unit having NAL unit type indicating the presence of a CRA picture for which each video coding layer (VCL) NAL unit of the CRA picture comprises a coded slice segment of the CRA picture (e.g. CRA_NUT), the device processes additional NAL units comprising IRAP pictures in the access unit to have NAL unit types indicating the presence of a NAL unit type indicating the presence of a CRA picture for which each video coding layer (VCL) NAL unit of the CRA picture comprises a coded slice segment of the CRA picture (e.g. CRA_NUT).

In the above examples, the type of processing done on the additional NAL units may depend on the type of the device doing the processing. For example, video encoder 20 may process the additional NAL units by implementing one or more of the various restrictions described in this disclosure. As an example, based on the NAL unit type of a first NAL unit, video encoder 20 may set the NAL unit type for subsequent NAL units as described above. Video decoder 30 may utilize the above restrictions to infer certain information about certain NAL units. As one example, if video decoder 30 knows a first NAL unit is of a certain type, it may be able to infer that subsequent NAL units are of a certain type or are limited to a certain group, and based on that information may be able to better allocate memory, better manage a decoded picture buffer, more efficiently process the subsequent NAL units, obtain computational efficiencies, etc. As another example, if a MANE receives a NAL unit of a certain type (e.g. IDR_N_LP), then the MANE may infer (before receiving all NAL units in the access unit) that all future access units in decoding order are also future in output order. Based on this information, the MANE may be able to more quickly respond to an access request by sending the stream starting with the access unit.

According to another technique of this disclosure, video encoder 20 may process a first NAL unit comprising a first picture of an access unit and, in response to determining the first NAL unit comprises an IRAP picture and in response to a NAL unit type for the first NAL unit indicating the presence of an IDR picture without any associated leading pictures (e.g. IDR_N_LP), for a second NAL unit of the access unit containing another IRAP picture, setting a NAL unit type for the second NAL unit to a NAL unit type indicating the presence of an IDR picture without any associated leading pictures (e.g. IDR_N_LP). Video encoder 20 can then transmit the first NAL unit and the second NAL unit. Additionally, in response to determining the first NAL unit contains the IRAP picture and in response to the NAL unit type for the first NAL unit indicating the presence of the IDR picture without any associated leading pictures (e.g. IDR_N_LP), for all video coding layer (VCL) NAL units of the access unit comprising IRAP pictures, video encoder 20 may set a NAL unit type for the NAL units to a NAL unit type indicating the presence of an IDR picture without any associated leading pictures (e.g. IDR_N_LP).

According to another technique of this disclosure, video decoder 30 may receive a first NAL unit comprising a first picture of an access unit; and in response to determining the first NAL unit comprises an IRAP picture and in response to a NAL unit type for the first NAL unit indicating the presence of an IDR picture without any associated leading pictures (e.g. IDR_N_LP), for a second NAL unit of the access unit comprising another IRAP picture, video decoder 30 may determine a NAL unit type for the second NAL unit to be a NAL unit type indicating the presence of an IDR picture without any associated leading pictures (e.g.

IDR_N_LP). Video decoder 30 may decode the first NAL unit and the second NAL unit based on the determined NAL unit type.

Figure 2:
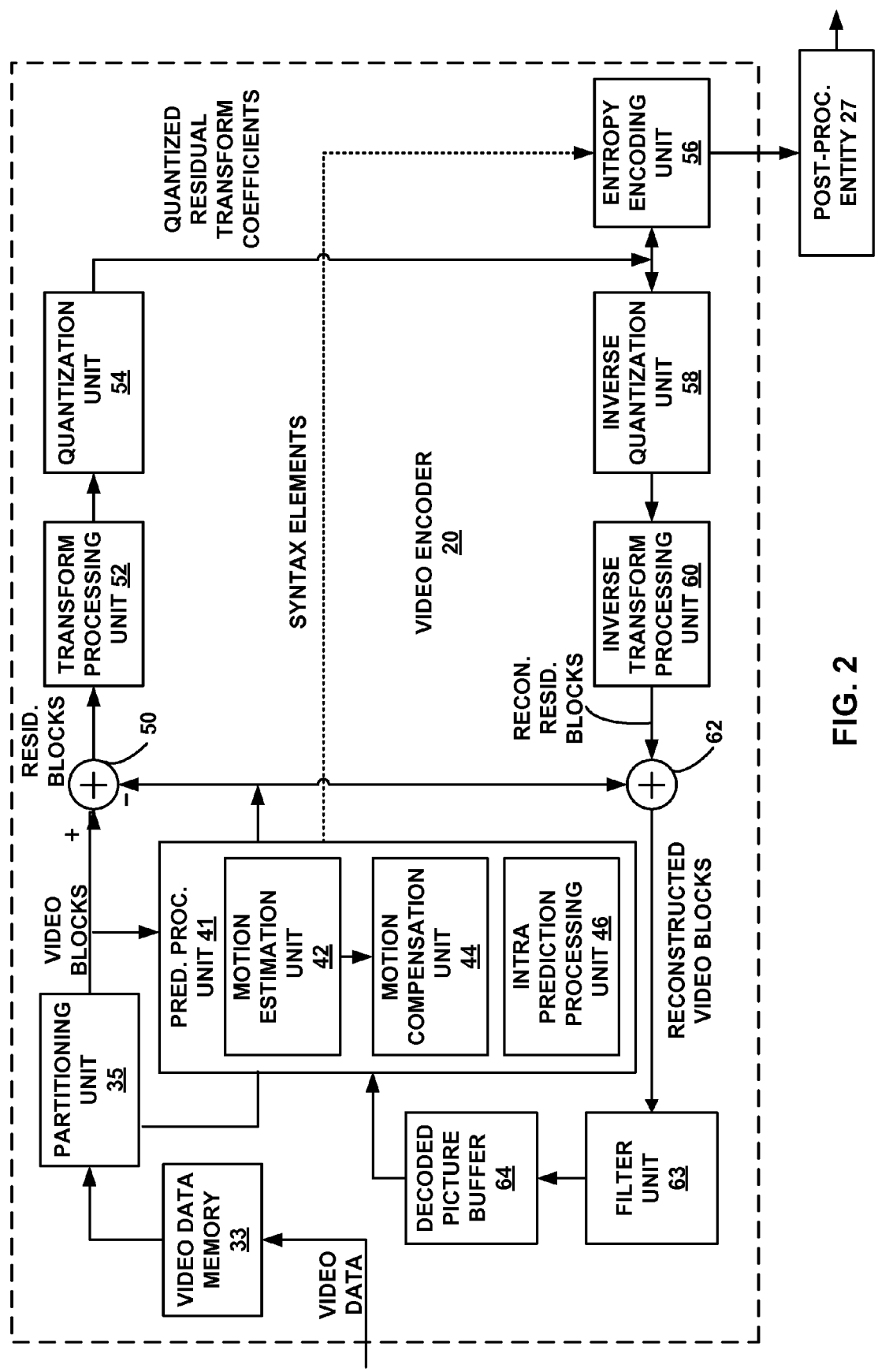
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may be configured to output video to post-processing entity 27. Post-processing entity 27 is intended to represent an example of a video entity, such as a MANE or splicing/editing device, that may process encoded video data from video encoder 20. In some instances, post-processing entity may be an example of a network entity. In some video encoding systems, post-processing entity 27 and video encoder 20 may be parts of separate devices, while in other instances, the functionality described with respect to post-processing entity 27 may be performed by the same device that comprises video encoder 20.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a video data memory 33, partitioning unit 35, prediction processing unit 41, filter unit 63, decoded picture buffer 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

Video data memory 33 may store video data to be encoded by the components of video encoder 20. The video data stored in video data memory 33 may be obtained, for example, from video source 18. Decoded picture buffer 64 may be a reference picture memory that stores reference video data for use in encoding video data by video encoder 20, e.g., in intra- or inter-coding modes. Video data memory 33 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and decoded picture buffer 64 may be provided by the same memory device or separate memory devices. In various examples, video data memory 33 may be on-chip with other components of video encoder 20, or off-chip relative to those components.

As shown in FIG. 2, video encoder 20 receives video data at video data memory 33, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

In this manner, video encoder 20 of FIG. 2 represents an example of a video encoder configured to generate an encoded bitstream of video data that conforms to some or all of the following restrictions on cross-layer IRAP picture alignment.

1) When one IRAP picture in an access unit has nal_unit_type equal to IDR_N_LP, any other IRAP picture in the same access unit shall have nal_unit_type equal to IDR_N_LP.
2) When one IRAP picture in an access unit has nal_unit_type equal to IDR_W_RADL any other IRAP picture in the same access unit shall have nal_unit_type equal to IDR_W_RADL.
3) When one IRAP picture in an access unit has nal_unit_type equal to BLA_N_LP, any other IRAP picture in the same access unit shall have nal_unit_type equal to BLA_N_LP or CRA_NUT.
4) When one IRAP picture in an access unit has nal_unit_type equal to BLA_W_LP or BLA_W_RADL, any other IRAP picture in the same access unit shall have nal_unit_type equal to BLA_W_LP, BLA_W_RADL, or CRA_NUT.

Note: When one IRAP picture in an access unit has nal_unit_type equal to CRA_NUT, any other IRAP picture in the same access unit must have nal_unit_type equal to CRA_NUT, BLA_W_LP, BLA_W_RADL, or BLA_N_LP.

Alternatively, video encoder 20 may be configured to generate an encoded bitstream such that it is disallowed to have BLA_N_LP in a lower layer and CRA_NUT in higher layer. Thus, items 3 and 4 above may be changed to:

3) When one IRAP picture in an access unit has nal_unit_type equal to BLA_N_LP and has nuh_layer_id equal to layerId, any other IRAP picture in the same access unit that has nuh_layer_id less than layerId shall have nal_unit_type equal to BLA_N_LP or CRA_NUT.

4) When one IRAP picture in an access unit has nal_unit_type equal to BLA_W_LP or BLA_W_RADL and has nuh_layer_id equal to layerId, any other IRAP picture in the same access unit that has nuh_layer_id less than layerId shall have nal_unit_type equal to BLA_W_LP, BLA_W_RADL, or CRA_NUT.

Alternatively, video encoder 20 may be configured to generate an encoded bitstream such that it is disallowed to have BLA_N_LP in a lower layer and CRA_NUT in higher layer. Thus, items 3 and 4 above may be changed to:

3) When one IRAP picture in an access unit has nal_unit_type equal to BLA_N_LP and has nuh_layer_id equal to layerIdA, any other IRAP picture in the same access unit that has nuh_layer_id equal to layerIdB, where layerIdB is less than layerIdA and direct_dependency_flag[LayerIdxInVps[layerIdA]][LayerIdxInVps[layerIdB]] is equal to 1, shall have nal_unit_type equal to BLA_N_LP or CRA_NUT.

4) When one IRAP picture in an access unit has nal_unit_type equal to BLA_W_LP or BLA_W_RADL and has nuh_layer_id equal to layerIdA, any other IRAP picture in the same access unit that has nuh_layer_id equal to layerIdB, where layerIdB is less than layerIdA and direct_dependency_flag[LayerIdxInVps[layerIdA]][LayerIdxInVps[layerIdB]] is equal to 1, shall have nal_unit_type equal to BLA_W_LP, BLA_W_RADL, or CRA_NUT.

Alternatively, video encoder 20 may be configured to generate a bitstream of encoded video data that implements the following restrictions on cross-layer IRAP picture alignment:

1) When one IRAP picture in an access unit has nal_unit_type equal to BLA_W_LP, BLA_W_RADL, or BLA_N_LP, any other IRAP picture in the same access unit shall have nal_unit_type equal to BLA_W_LP, BLA_W_RADL, or BLA_N_LP.

2) When one IRAP picture in an access unit has nal_unit_type equal to IDR_W_RADL or IDR_N_LP, any other IRAP picture in the same access unit shall have nal_unit_type equal to IDR_W_RADL or IDR_N_LP.

3) When one IRAP picture in an access unit has nal_unit_type equal to CRA_NUT, any other IRAP picture in the same access unit shall have nal_unit_type equal to CRA_NUT.

Figure 3:
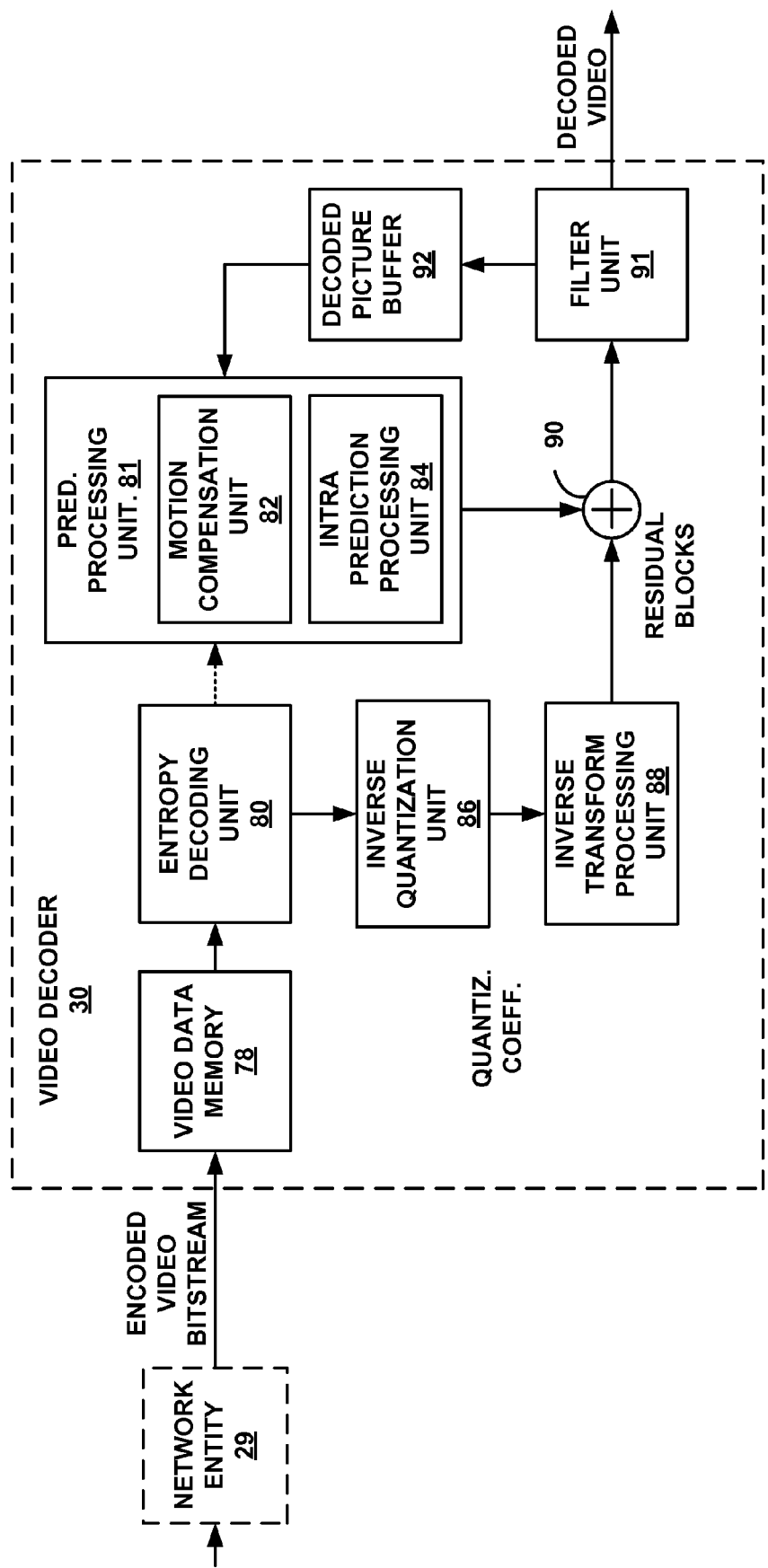
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes video data memory 78, an entropy decoding unit 80, prediction processing unit 81, inverse quantization unit 86, inverse transform processing unit 88, summer 90, filter unit 91, and decoded picture buffer 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 2.

Video data memory 78 may store video data, such as an encoded video bitstream, to be decoded by the components of video decoder 30. The video data stored in video data memory 78 may be obtained, for example, from computer-readable medium 16, e.g., from a local video source, such as a camera, via wired or wireless network communication of video data, or by accessing physical data storage media. Video data memory 78 may form a coded picture buffer (CPB) that stores encoded video data from an encoded video bitstream. Decoded picture buffer 92 may be a reference picture memory that stores reference video data for use in decoding video data by video decoder 30, e.g., in intra- or inter-coding modes. Video data memory 78 and decoded picture buffer 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 78 and decoded picture buffer 92 may be provided by the same memory device or separate memory devices. In various examples, video data memory 78 may be on-chip with other components of video decoder 30, or off-chip relative to those components.

During the decoding process, video decoder 30 receives, into video data memory 78, an encoded video bitstream that represents video blocks of an encoded video slice and associated syntax elements from video encoder 20. Video decoder 30 may receive the encoded video bitstream from network entity 29. Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in decoded picture buffer 92, which stores reference pictures used for subsequent motion compensation. Decoded picture buffer 92 also stores decoded video for later presentation on a display device, such as display device 32 of FIG. 1.

In this manner, video decoder 30 of FIG. 3 represents an example of a video decoder configured to decode an encoded bitstream of video data that conforms to some or all of the following restrictions on cross-layer IRAP picture alignment.
1) When one IRAP picture in an access unit has nal_unit_type equal to IDR_N_LP, any other IRAP picture in the same access unit shall have nal_unit_type equal to IDR_N_LP.
2) When one IRAP picture in an access unit has nal_unit_type equal to IDR_W_RADL any other IRAP picture in the same access unit shall have nal_unit_type equal to IDR_W_RADL.
3) When one IRAP picture in an access unit has nal_unit_type equal to BLA_N_LP, any other IRAP picture in the same access unit shall have nal_unit_type equal to BLA_N_LP or CRA_NUT.
4) When one IRAP picture in an access unit has nal_unit_type equal to BLA_W_LP or BLA_W_RADL, any other IRAP picture in the same access unit shall have nal_unit_type equal to BLA_W_LP, BLA_W_RADL, or CRA_NUT.

Note: When one IRAP picture in an access unit has nal_unit_type equal to CRA_NUT, any other IRAP picture in the same access unit must have nal_unit_type equal to CRA_NUT, BLA_W_LP, BLA_W_RADL, or BLA_N_LP.

Alternatively, video decoder 30 may be configured to decode a video bitstereem such that it is disallowed, in the bitstream, to have BLA_N_LP in a lower layer and CRA_NUT in higher layer. Accordingly, items 3 and 4 above may be changed as follows:
3) When one IRAP picture in an access unit has nal_unit_type equal to BLA_N_LP and has nuh_layer_id equal to layerId, any other IRAP picture in the same access unit that has nuh_layer_id less than layerId shall have nal_unit_type equal to BLA_N_LP or CRA_NUT.
4) When one IRAP picture in an access unit has nal_unit_type equal to BLA_W_LP or BLA_W_RADL and has nuh_layer_id equal to layerId, any other IRAP picture in the same access unit that has nuh_layer_id less than layerId shall have nal_unit_type equal to BLA_W_LP, BLA_W_RADL, or CRA_NUT.

Alternatively, video decoder may be configured to decode a video bitstream such that it is disallowed to have BLA_N_LP in a lower layer and CRA_NUT in higher layer. Accordingly, items 3 and 4 may be changed as follows.
3) When one IRAP picture in an access unit has nal_unit_type equal to BLA_N_LP and has nuh_layer_id equal to layerIdA, any other IRAP picture in the same access unit that has nuh_layer_id equal to layerIdB, where layerIdB is less than layerIdA and direct_dependency_flag[LayerIdxInVps[layerIdA]][LayerIdxInVps[layerIdB]] is equal to 1, shall have nal_unit_type equal to BLA_N_LP or CRA_NUT.
4) When one IRAP picture in an access unit has nal_unit_type equal to BLA_W_LP or BLA_W_RADL and has nuh_layer_id equal to layerIdA, any other IRAP picture in the same access unit that has nuh_layer_id equal to layerIdB, where layerIdB is less than layerIdA and direct_dependency_flag[LayerIdxInVps[layerIdA]][LayerIdxInVps[layerIdB]] is equal to 1, shall have nal_unit_type equal to BLA_W_LP, BLA_W_RADL, or CRA_NUT.

Alternatively, video decoder 30 may be configured to decode a video bitstream that incorporates the following restrictions on cross-layer IRAP picture alignment.
1) When one IRAP picture in an access unit has nal_unit_type equal to BLA_W_LP, BLA_W_RADL, or BLA_N_LP, any other IRAP picture in the same access unit shall have nal_unit_type equal to BLA_W_LP, BLA_W_RADL, or BLA_N_LP.
2) When one IRAP picture in an access unit has nal_unit_type equal to IDR_W_RADL or IDR_N_LP, any other IRAP picture in the same access unit shall have nal_unit_type equal to IDR_W_RADL or IDR_N_LP.
3) When one IRAP picture in an access unit has nal_unit_type equal to CRA_NUT, any other IRAP picture in the same access unit shall have nal_unit_type equal to CRA_NUT.

Figure 4:
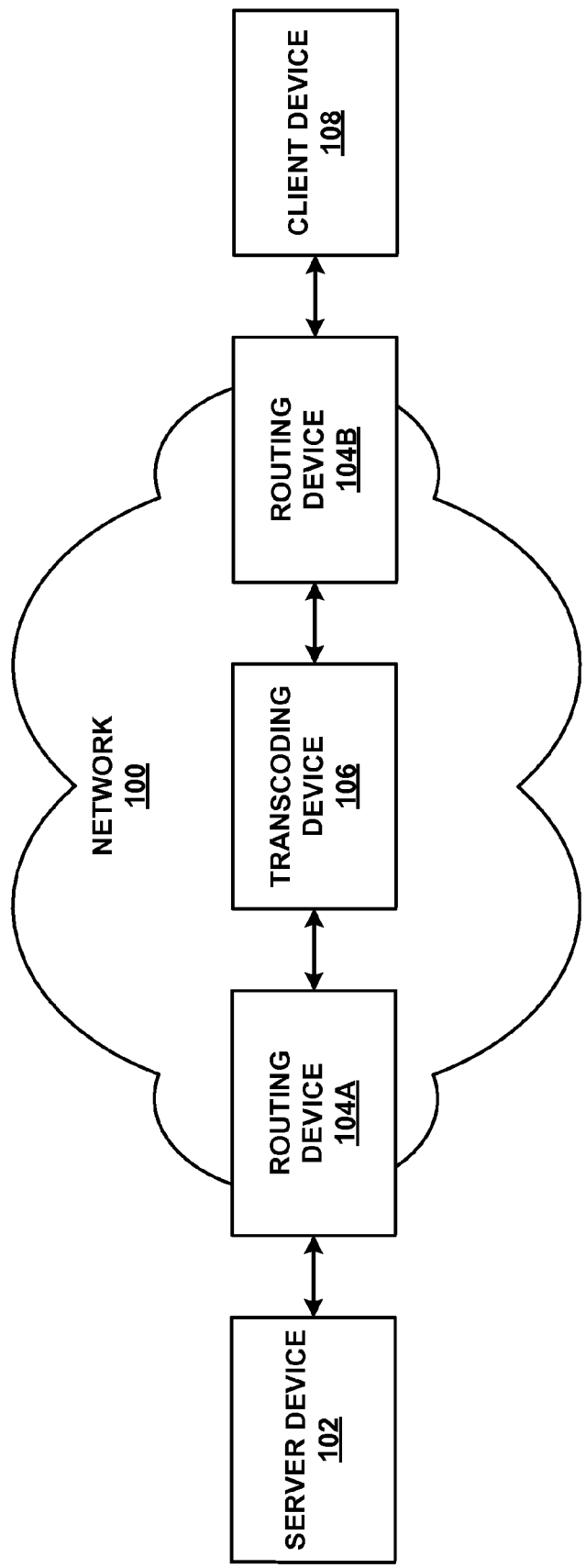
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples. The devices of FIG. 4 represent examples of devices configured to process video data, such as video data generated by video encoder 20, described in this disclosure.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure. Moreover, the devices of FIG. 1, and video encoder 20 illustrated in FIG. 2 and video decoder 30 illustrated in FIG. 3 are also exemplary devices that can be configured to perform the techniques of this disclosure.

For examples, server device 102 may include a video encoder to encode a picture or pictures that are after a random access point or stream adaptation point, such as a temporal layer switching point, or other stream adaptation point. For example, this point could be a switching point for adaptation of bit rate, frame rate (i.e., temporal layer switching point), or spatial resolution Similarly, client device 108 may decode a picture or pictures that are after a random access point or stream adaptation point, such as a temporal layer switching point.

Figure 5:
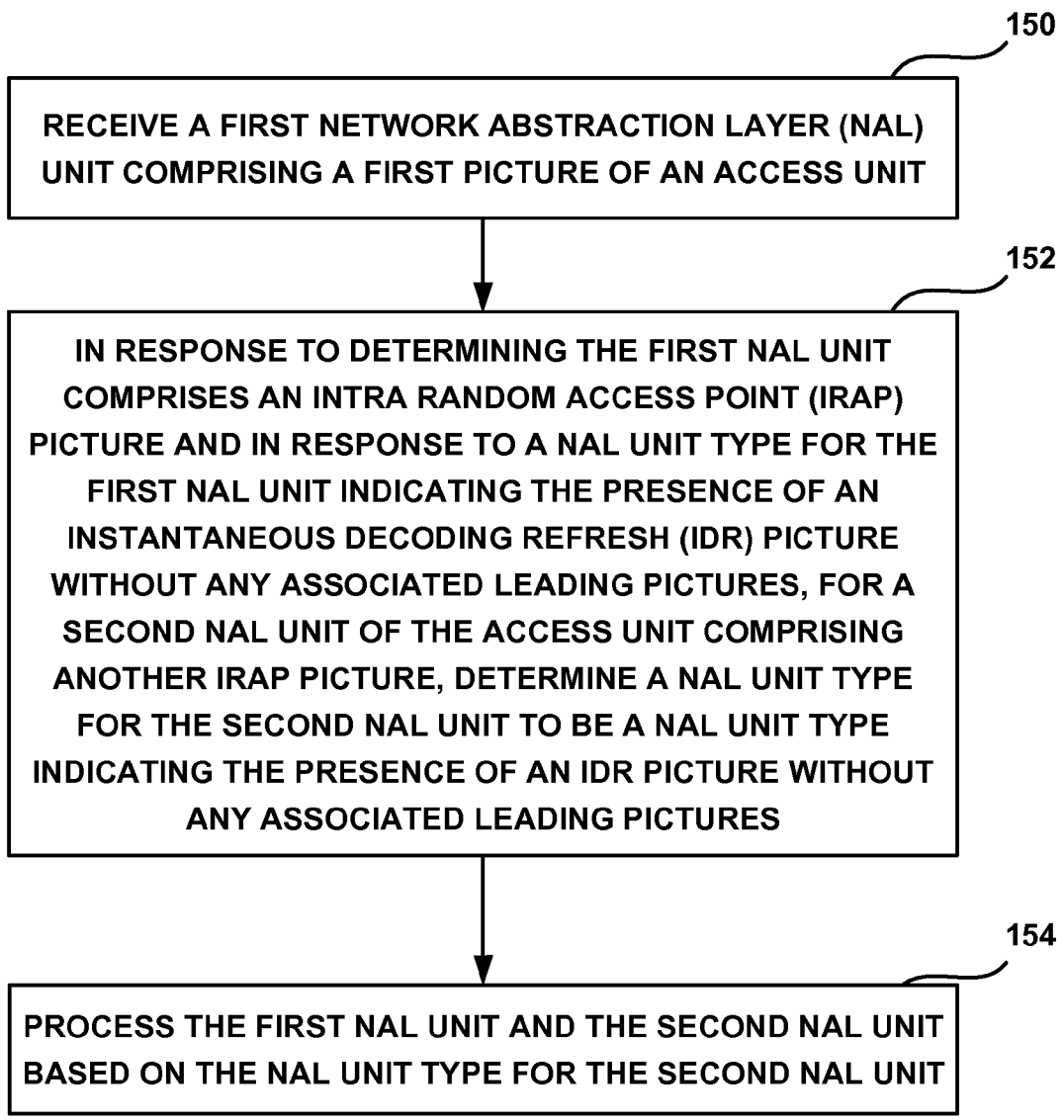
FIG. 5 is a flowchart showing an example of a method of processing video data according to the techniques of this disclosure.

FIG. 5 is a flowchart showing an example of a method of processing (e.g. decoding or routing) video data according to the techniques of this disclosure. The techniques of FIG. 5 will be described with reference to a generic video processing device. The video processing device may, for example, correspond to any of video decoder 30, network entity 29, routing devices 104 A and 104B, or transcoding device 106.

The video processing device receives a first NAL unit that includes a first picture of an access unit (150). In response to determining the first NAL unit includes an IRAP picture and in response to a NAL unit type for the first NAL unit indicating the presence of an IDR picture without any associated leading pictures, for a second NAL unit of the access unit comprising another IRAP picture, the video processing devices determines a NAL unit type for the second NAL unit to be a NAL unit type indicating the presence of an IDR picture without any associated leading pictures (152). The video processing devices processes the first NAL unit and the second NAL unit based on the NAL unit type for the second NAL unit (154). The second NAL unit may, for example, be a VCL NAL unit. According to another aspect of the techniques of FIG. 5, in response to determining the first NAL unit comprises the IRAP picture and in response to the NAL unit type for the first NAL unit indicating the presence of the IDR picture without any associated leading pictures, for all VCL NAL units of the access unit comprising IRAP pictures, the video processing device may determine a NAL unit type for the NAL units to a NAL unit type indicating the presence of an IDR picture without any associated leading pictures.

In the example of FIG. 5, the video processing device may determine the NAL unit type for the second NAL unit to be a NAL unit type indicating the presence of an IDR picture without any associated leading pictures by inferring before parsing the second NAL unit that the NAL unit type for the second NAL unit is the NAL unit type indicating the presence of an IDR picture without any associated leading pictures.

In the example of FIG. 5, the video processing device may process the first NAL unit and the second NAL unit based on the NAL unit type for the second NAL unit by making a decision regarding a decoded picture buffer based on the second NAL unit type. For example, the video processing device may determine that certain pictures can be discarded or certain pictures need to be kept. The video processing device may also allocate memory based on the NAL unit type for the second NAL unit.

In examples where the video processing devices includes a video decoder, the video processing device may process the first NAL unit and the second NAL unit based on the NAL unit type for the second NAL unit by decoding the first NAL unit and the second NAL unit based on the NAL unit type for the second NAL unit.

Figure 6:
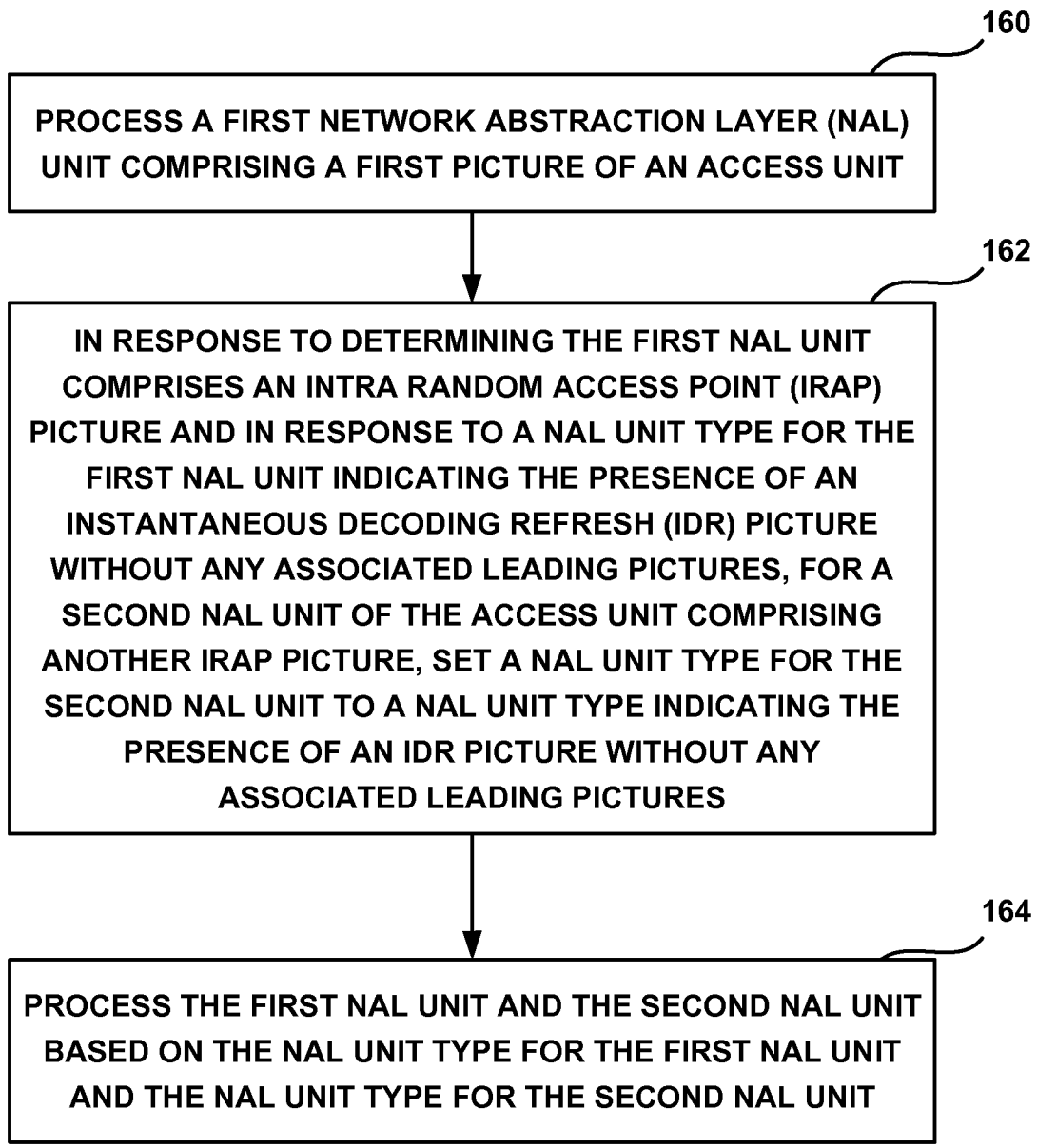
FIG. 6 is a flowchart showing an example of a method of processing video data according to the techniques of this disclosure.

FIG. 6 is a flowchart showing an example of a method of processing (e.g. encoding or routing) video data according to the techniques of this disclosure. The techniques of FIG. 6 will be described with reference to a generic video processing device. The video processing device may, for example, correspond to any of video encoder 20, network entity 29, routing devices 104 A and 104B, or transcoding device 106.

The video processing device processes a first NAL unit comprising a first picture of an access unit (160). In response to determining the first NAL unit comprises an IRAP picture and in response to a NAL unit type for the first NAL unit indicating the presence of an IDR picture without any associated leading pictures, for a second NAL unit of the access unit comprising another IRAP picture, the video processing device sets a NAL unit type for the second NAL unit to a NAL unit type indicating the presence of an IDR picture without any associated leading pictures (162). The video processing device processes the first NAL unit and the second NAL unit based on the NAL unit type for the first NAL unit and the NAL unit type for the second NAL unit (164). The second NAL unit may, for example, be a video coding layer VCL NAL unit. In some implementations, in response to determining the first NAL unit comprises the IRAP picture and in response to the NAL unit type for the first NAL unit indicating the presence of the IDR picture without any associated leading pictures, for all video coding layer (VCL) NAL units of the access unit comprising IRAP pictures, the video processing device may set a NAL unit type for the NAL units to a NAL unit type indicating the presence of an IDR picture without any associated leading pictures.

In examples where the video processing device is a video encoder, the video processing device may process the first NAL unit and the second NAL unit based on the NAL unit type for the first NAL unit and the NAL unit type for the second NAL unit by encoding the first NAL unit and the second NAL unit. In examples where the video processing device is a MANE, the video processing device may process the first NAL unit and the second NAL unit based on the NAL unit type for the first NAL unit and the NAL unit type for the second NAL unit by transmitting the first NAL unit and the second NAL unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing received multi-layer video data, the method comprising:
   receiving a network abstraction layer (NAL) unit comprising a picture, wherein the NAL unit belongs to a set of NAL units for an access unit comprising two or more pictures for a same instance in time;
   in response to determining the NAL unit comprises an intra random access point (IRAP) picture and in response to determining a NAL unit type for the NAL unit indicates the presence of an instantaneous decoding refresh (IDR) picture without any associated leading pictures, determining a NAL unit type for any other NAL units, of the set of NAL units for the access unit, comprising an IRAP picture to be a NAL unit type indicating the presence of an IDR picture without any associated leading pictures; and
   processing the NAL unit and the any other NAL units based on the NAL unit type for the any other NAL units.

2. The method of claim 1, wherein determining a NAL unit type for the any other NAL units to be a NAL unit type indicating the presence of an IDR picture without any associated leading pictures comprises inferring before parsing the any other NAL units that the NAL unit type for the any other NAL units is the NAL unit type indicating the presence of an IDR picture without any associated leading pictures.

3. The method of claim 1, wherein processing the NAL unit and the any other NAL units based on the NAL unit type for the any other NAL units comprises making a decision regarding a decoded picture buffer based on the NAL units type.

4. The method of claim 1, wherein processing the NAL unit and the any other NAL units based on the NAL unit type for the any other NAL units comprises allocating memory of a video decoder based on the NAL unit type.

5. The method of claim 1, wherein the any other NAL units comprise video coding layer (VCL) NAL units.

6. The method of claim 1, wherein the set of NAL units comprises video coding layer (VCL) NAL units and non-VCL NAL units, and wherein the VCL NAL units comprise IRAP pictures and non-IRAP pictures, the method further comprising:
   in response to determining the NAL unit comprises the IRAP picture and in response to the NAL unit type for the NAL unit indicating the presence of the IDR picture without any associated leading pictures, for all VCL NAL units of the access unit comprising IRAP pictures, determining a NAL unit type for all the VCL NAL units comprising TRAP pictures to be a NAL unit type indicating the presence of an IDR picture without any associated leading pictures.

7. The method of claim 1, wherein processing the NAL unit and the any other NAL units based on the NAL unit type for the any other NAL units comprises decoding the NAL unit and the any other NAL units based on the NAL unit type for the any other NAL units.

8. The method of claim 1, wherein processing the received multi-layer video data comprises one of:
   decoding the received multi-layer video data;
   parsing the received multi-layer video data; or
   transcoding received multi-layer the video data.

9. A method of processing multi-layer video data, the method comprising:
processing a first network abstraction layer (NAL) unit comprising a picture of an access unit, wherein the access unit comprises a set of NAL units for two or more pictures for a same instance in time;
in response to determining the NAL unit comprises an intra random access point (IRAP) picture and in response to a NAL unit type for the NAL unit indicating the presence of an instantaneous decoding refresh (IDR) picture without any associated leading pictures, setting a NAL unit type for any other NAL units, of the set of NAL units, comprising IRAP pictures to the NAL unit type indicating the presence of an IDR picture without any associated leading pictures; and
processing the NAL unit and the any other NAL units based on the NAL unit type for the NAL unit and the NAL unit type for the any other NAL units.

10. The method of claim 9, wherein processing the NAL unit and the any other NAL units based on the NAL unit type for the NAL unit and the NAL unit type for the any other NAL units comprises encoding the NAL unit and the any other NAL units.

11. The method of claim 9, wherein processing the NAL unit and the any other NAL units based on the NAL unit type for the NAL unit and the NAL unit type for the any other NAL units comprise transmitting the NAL unit and the any other NAL units.

12. The method of claim 9, wherein the any other NAL units comprise video coding layer (VCL) NAL unit.

13. The method of claim 9, wherein the set of NAL units comprises video coding layer (VCL) NAL units and non-VCL NAL units, and wherein the VCL NAL units comprise IRAP pictures and non-IRAP pictures, the method further comprising:
in response to determining the NAL unit comprises the IRAP picture and in response to the NAL unit type for the NAL unit indicating the presence of the IDR picture without any associated leading pictures, for all VCL NAL units, of the set of NAL units, comprising IRAP pictures, setting a NAL unit type for the NAL units to a NAL unit type indicating the presence of an IDR picture without any associated leading pictures.

14. A video processing device for processing received multi-layer video data, the video processing device comprising:
a memory storing video data; and
one or more processors configured to:
receive a first network abstraction layer (NAL) unit comprising a picture of an access unit, wherein the access unit comprises a set of NAL units for two or more pictures for a same instance in time;
in response to determining the NAL unit comprises an intra random access point (IRAP) picture and in response to determining a NAL unit type for the NAL unit indicates the presence of an instantaneous decoding refresh (IDR) picture without any associated leading pictures, determine a NAL unit type for any other NAL units, of the set of NAL units for the access unit, comprising an TRAP picture to be a NAL unit type indicating the presence of an IDR picture without any associated leading pictures; and
process the NAL unit and the any other NAL units based on the NAL unit type for the any other NAL units.

15. The video processing device of claim 14, wherein the one or more processors are further configured to determine a NAL unit type for the any other NAL units to be a NAL unit type indicating the presence of an IDR picture without any associated leading pictures by inferring before parsing the any other NAL units that the NAL unit type for the any other NAL units is the NAL unit type indicating the presence of an IDR picture without any associated leading pictures.

16. The video processing device of claim 14, wherein the one or more processors process the NAL unit and the any other NAL units based on the NAL unit type for the any other NAL units by making a decision regarding a decoded picture buffer based on the NAL unit type.

17. The video processing device of claim 14, wherein the one or more processors process the NAL unit and the any other NAL units based on the NAL unit type for the any other NAL units by allocating memory of a video decoder based on the NAL unit type.

18. The video processing device of claim 14, wherein the any other NAL units comprise a video coding layer (VCL) NAL unit.

19. The video processing device of claim 14, wherein the set of NAL units comprises video coding layer (VCL) NAL units and non-VCL NAL units, and wherein the VCL NAL units comprise IRAP pictures and non-IRAP pictures, and wherein the one or more processors are further configured to, in response to determining the NAL unit comprises the IRAP picture and in response to the NAL unit type for the NAL unit indicating the presence of the IDR picture without any associated leading pictures, for all VCL NAL units of the set of NAL units comprising IRAP pictures, determine a NAL unit type for all the VCL NAL units comprising TRAP pictures to be a NAL unit type indicating the presence of an IDR picture without any associated leading pictures.

20. The video processing device of claim 14, wherein the one or more processors process the NAL unit and the any other NAL units based on the NAL unit type for the any other NAL units by decoding the NAL unit and the any other NAL units based on the NAL unit type for the any other NAL units.

21. The video processing device of claim 14, wherein the video processing device comprises a video encoder.

22. The video processing device of claim 14, wherein the video processing device comprises a video decoder.

23. The video processing device of claim 14, wherein the video processing device comprise a media aware network element (MANE).

24. A video processing device for processing multi-layer video data, the video processing device comprising:
a memory storing video data; and
one or more processors configured to:
process a first network abstraction layer (NAL) unit comprising a picture of an access unit of the video data, wherein the access unit comprises a set of NAL units for two or more pictures for a same instance in time;
in response to determining the NAL unit comprises an intra random access point (IRAP) picture and in response to a NAL unit type for the NAL unit indicating the presence of an instantaneous decoding refresh (IDR) picture without any associated leading pictures, set a NAL unit type for any other NAL units, of the set of NAL units, comprising IRAP pictures to the NAL unit type indicating the presence of an IDR picture without any associated leading pictures; and
process the NAL unit and the any other NAL units based on the NAL unit type for the NAL unit and the NAL unit type for the any other NAL units.

25. The video processing device of claim 24, wherein the one or more processors process the NAL unit and the any other NAL units based on the NAL unit type for the NAL unit and the NAL unit type for the any other NAL units by encoding the NAL unit and the any other NAL units.

26. The video processing device of claim 24, wherein the one or more processors process the NAL unit and the any other NAL units based on the NAL unit type for the NAL unit and the NAL unit type for the any other NAL units by transmitting the NAL unit and the any other NAL units.

27. The video processing device of claim 24, wherein any other NAL units comprise video coding layer (VCL) NAL units.

28. The video processing device of claim 24, wherein the set of NAL units comprises video coding layer (VCL) NAL units and non-VCL NAL units, and wherein the VCL NAL units comprise IRAP pictures and non-IRAP pictures, and where the one or more processors process are further configured to, in response to determining the NAL unit comprises the IRAP picture and in response to the NAL unit type for the NAL unit indicating the presence of the IDR picture without any associated leading pictures, for all VCL NAL units, of the set of NAL units, comprising TRAP pictures, set a NAL unit type for the NAL units to a NAL unit type indicating the presence of an IDR picture without any associated leading pictures.

29. The video processing device of claim 24, wherein the video processing device comprises a video encoder.

30. The video processing device of claim 24, wherein the video processing device comprise a media aware network element (MANE).

* * * * *